United States Patent
Saida et al.

[19]

[11] Patent Number: 6,005,435
[45] Date of Patent: Dec. 21, 1999

[54] HIGH-VOLTAGE GENERATING CIRCUIT

[75] Inventors: Yasunobu Saida; Nobuaki Imamura; Yasuhiko Toda, all of Omihachiman; Haruo Takahashi; Masaru Omura, both of Moriyama; Hisashi Takiguchi, Omihachiman, all of Japan

[73] Assignee: Murata Manufacturing Co., Ltd., Japan

[21] Appl. No.: 08/995,726

[22] Filed: Dec. 22, 1997

[30] Foreign Application Priority Data

Dec. 30, 1996 [JP] Japan .................................. 8-357579

[51] Int. Cl.$^6$ ...................................................... G05F 1/10
[52] U.S. Cl. .......................... 327/538; 327/540; 327/290; 363/97
[58] Field of Search .................................. 363/78, 95, 97; 327/268, 283, 290, 304, 538, 546, 535

[56] References Cited

U.S. PATENT DOCUMENTS 5,508,904  4/1996  Hara .......................................... 363/21
5,656,890  8/1997  Park ............................................ 315/1

Primary Examiner—Terry D. Cunningham
Assistant Examiner—An T. Luu
Attorney, Agent, or Firm—Ostrolenk, Faber, Gerb & Soffen, LLP

[57] ABSTRACT

A high-voltage generating circuit includes a high-voltage production circuit, a high-voltage detecting circuit, and a control circuit. The high-voltage detecting circuit has a high-voltage circuit section to which a voltage of 1 kV to several tens of kilovolts is applied and a low-voltage circuit section to which a voltage of several tens of volts is applied. In the high-voltage circuit section, a parallel circuit formed of a first voltage-dividing resistor and a part of a second voltage-dividing resistor and a speed-up capacitor, and another parallel circuit formed of the remaining part of the second voltage-dividing resistor and a third voltage-dividing resistor and another speed-up capacitor are connected in series to form a two-stage parallel circuit.

10 Claims, 6 Drawing Sheets

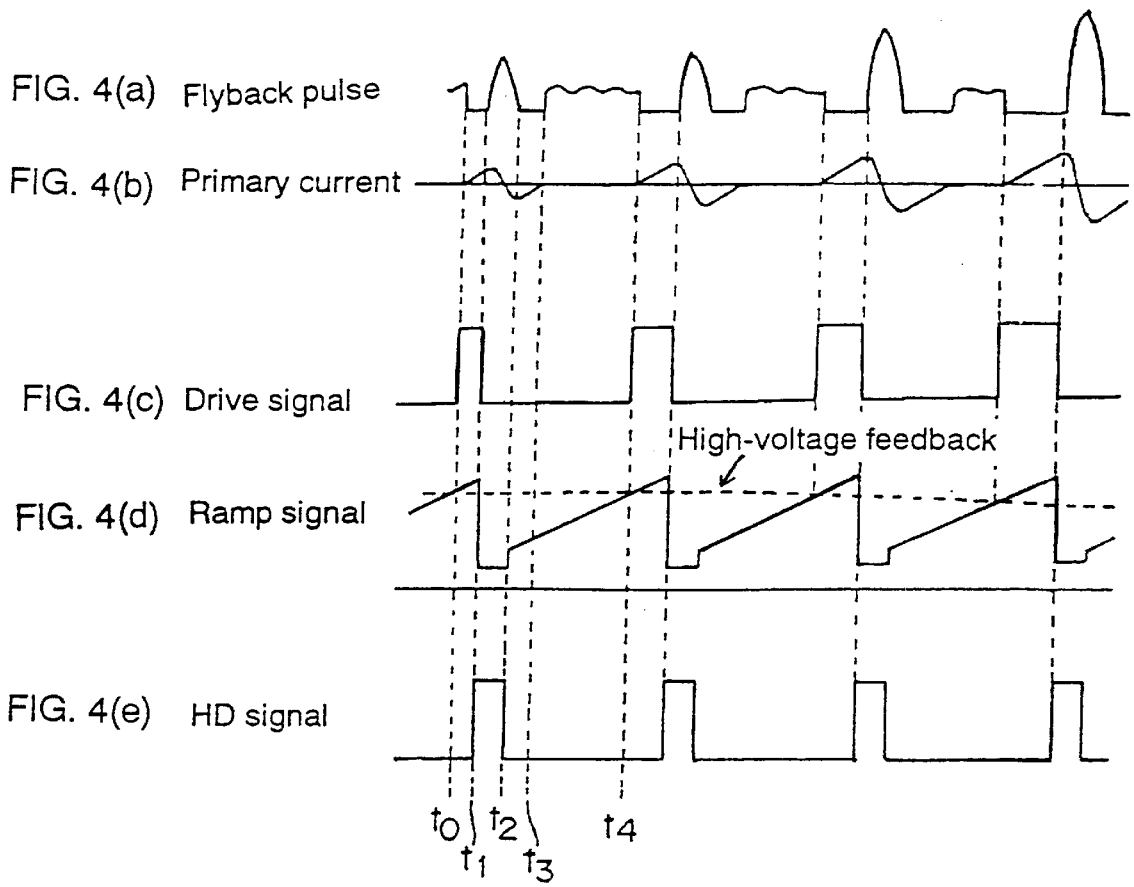
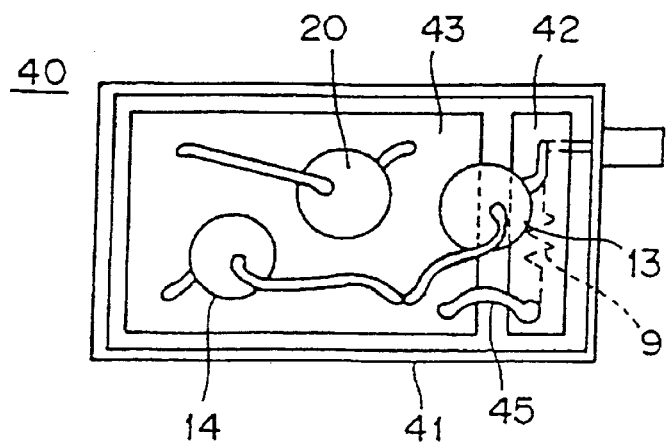

HIGH-VOLTAGE GENERATING CIRCUIT

BACKGROUND OF THE INVENTION

1. Field of the Invention

The present invention relates to high-voltage generating circuits, and more particularly, to a high-voltage generating circuit for generating a high voltage applied to the anode of a cathode-ray tube (CRT).

2. Description of the Related Art

A high-voltage generating circuit as shown in FIG. 10 is conventionally known. This high-voltage generating circuit 141 generally includes a high-voltage production circuit 160, a high-voltage detecting circuit 161, and a control circuit 162. The high-voltage detecting circuit 161 detects a fluctuation of a high voltage output from the high-voltage production circuit 160. The control circuit 162 controls a variable DC power source 146 according to a detection voltage output from the high-voltage detecting circuit 161 to compensate the high voltage output from the high-voltage production circuit 160 for its fluctuation and to make the high voltage stable.

The high-voltage production circuit 160 is formed of a switching device 142, a damping diode 143, a resonant capacitor 144, a flyback transformer 145, the variable driving power source 146, and rectifying diodes 156 and 157.

The high-voltage detecting circuit 161 includes voltage-dividing resistors 147, 148, 149, and 150 for dividing the high voltage output from the high-voltage production circuit 160, and speed-up capacitors 151 and 152 for increasing the rise speed of the high voltage output from the high-voltage production circuit 160. Voltage-dividing resistors 147, 148 and 149 are connected in series, and together with the speed-up capacitor 151, form a parallel circuit serving as a high-voltage circuit section 161a. The voltage-dividing resistor 150 and the speed-up capacitor 152 form a parallel circuit serving as a low-voltage circuit section 161b. The voltage-dividing resistor 148 also serves as a focus voltage adjustment resistor, and the voltage-dividing resistor 149 also serves as a screen voltage adjustment resistor. There are also shown a focus capacitor 154 and a screen capacitor 155.

Since a high voltage (1 kV to several tens of kilovolts) output from the high-voltage production circuit 160 is applied to the speed-up capacitor 151 in the conventional high-voltage generating circuit 141, there has been a problem that the capacitor 151 needs to satisfy a high breakdown voltage specification, and is expensive and large.

In addition, a cathode-ray tube (CRT) generally has a capacitance of several hundreds to several thousands of picofarads. When a screen A of the cathode-ray tube has a white portion W having a high luminance level (hatched portion B is black) as shown in FIG. 11, a large beam current flows at the white portion W in the cathode-ray tube and a high voltage cannot quickly be reproduced if the high voltage drops. As a result, the contour of the white portion W on the screen is distorted as shown by dotted lines, which is called a trapezoidal distortion, and the image quality deteriorates. It has been proposed as a countermeasure to use the speed-up capacitor 151 having a large capacitance. However, in the case, it is necessary to extend the blanking period so as not to clearly show a change on the screen until the high voltage rises because the rise speed of a high voltage decreases. Although a smoothing capacitor having a large capacitance and satisfying the high breakdown voltage specification may be provided in addition to the speed-up capacitor 151, the additional capacitor is expensive and large, whereby the high-voltage generating circuit becomes large and expensive.

SUMMARY OF THE INVENTION

Accordingly, it is an object of the present invention to provide a high-voltage generating circuit in which a speed-up capacitor in a high-voltage circuit section can be made compact and a high output voltage rises quickly.

According to the invention, a high-voltage generating circuit includes a high-voltage production circuit for accumulating electric energy supplied from a power source in an LC resonant circuit during a transistor period and for converting the electric energy accumulated in the LC resonant circuit to a high voltage during the flyback period determined by the resonant frequency of the LC resonant circuit; a high-voltage detecting circuit including a high-voltage circuit section formed of a multiple-stage parallel circuit in which two or more parallel circuits having a voltage-dividing resistor and a speed-up capacitor are connected in series and a low-voltage circuit section which is connected in series to the high-voltage circuit section and which has a parallel circuit formed of a voltage-dividing resistor and a speed-up capacitor, the high-voltage detecting circuit dividing the high voltage output from the high-voltage production circuit by the voltage-dividing resistors into a lower voltage and detecting it; and a control circuit for controlling the high voltage according to the detected voltage sent from the high-voltage detecting circuit.

Since the high-voltage circuit section of the high-voltage detecting circuit is formed of a multiple-stage parallel circuit in which two or more parallel circuits having a voltage-dividing resistor and a speed-up capacitor are connected in series according to the present invention, the number of speed-up capacitors in the high-voltage circuit section increases as compared with the case in the conventional high-voltage generating circuit, and the voltage applied to each of the speed-up capacitors becomes lower. Therefore, compact capacitors having a low breakdown voltage can be used for the speed-up capacitors.

In the high-voltage generating circuit, at least one of the voltage-dividing resistors in the high-voltage circuit section may serve as a variable resistor for dynamic focus, a variable resistor for static focus, or a variable resistor for a screen voltage in a double-focus circuit. At least one of the voltage-dividing resistors in the high-voltage circuit section may serve as a variable resistor for focus or a variable resistor for a screen voltage in a single-focus circuit. A speed-up capacitor in the high-voltage circuit section may serve as a capacitor for static focus in a double-focus circuit, or a capacitor for focus in a single-focus circuit.

In a high-voltage generating circuit employing the pulse-width control method, which provides a good response for stabilizing a high voltage, capacitors having small capacitances can be used for the speed-up capacitors. The speed-up capacitors can be made further compact and the rise time of the high output voltage can be made shorter.

A speed-up capacitor may serve as the capacitor for static focus in the double-focus circuit, and a voltage-dividing resistor may serve as the variable resistor for static focus. As a result, the number of components used is reduced.

The high-voltage generating circuit may be configured such that the ground point of a series circuit formed of a variable resistor for dynamic focus and a variable resistor for a screen voltage in a double-focus circuit is separated from the ground point of a variable resistor for static focus in the double-focus circuit; at least one of the voltage-dividing resistors in the high-voltage circuit section serves as the variable resistor for static focus; and at least one of the speed-up capacitors in the high-voltage circuit section serves as a capacitor for static focus.

Since the ground point of the series circuit formed of the variable resistor for dynamic focus and the variable resistor for the screen in the double-focus circuit is separated from the ground point of the variable resistor for static focus in the double-focus circuit, a current flowing through the variable resistor for static focus is unlikely to leak out from the capacitor for the screen voltage. The capacitance of the capacitor for static focus serving also as a speed-up capacitor can be made small, and the rise time of the high output voltage can be made further short.

The high-voltage generating circuit may be configured such that a high-voltage-side parallel circuit in the high-voltage circuit section is formed of one speed-up capacitor and one fixed voltage-dividing resistor; and both ends of the speed-up capacitor are connected to both ends of the fixed voltage-dividing resistor.

The speed-up capacitor can be electrically connected to the voltage-dividing resistor without increasing the number of connection points.

The high-voltage generating circuit may be configured such that a variable resistor for dynamic focus, a variable resistor for static focus, and a variable resistor for a screen voltage in a double-focus circuit are mounted on the front surface of a circuit board; at least one of the speed-up capacitors in the high-voltage circuit section, and a capacitor for dynamic focus and a capacitor for static focus in the double-focus circuit are disposed on the rear surface of the circuit board; and the circuit board is accommodated into one insulating case.

Therefore, the speed-up capacitors, the capacitor for dynamic focus, and the capacitor for static focus are disposed within the high-voltage generating circuit at a space as small as possible.

A space in the case is efficiently used for disposing capacitors, otherwise it is left as a dead or unused space.

Other features and advantages of the present invention will become apparent from the following description of the invention which refers to the accompanying drawings.

BRIEF DESCRIPTION OF THE DRAWINGS

FIGS. 4(a) to 4(e) are timing charts of the high-voltage generating circuit shown in FIG. 1.

FIG. 5 is an internal plan viewed from the bottom of a variable resistor unit for a high voltage in the high-voltage generating circuit shown in FIG. 1.

DETAILED DESCRIPTION OF EMBODIMENTS OF THE INVENTION

High-voltage generating circuits according to embodiments of the present invention will be described below by referring to the accompanying drawings. In each embodiment, the same symbols are assigned to the same components or the same portions.

First Embodiment

Figure 1:
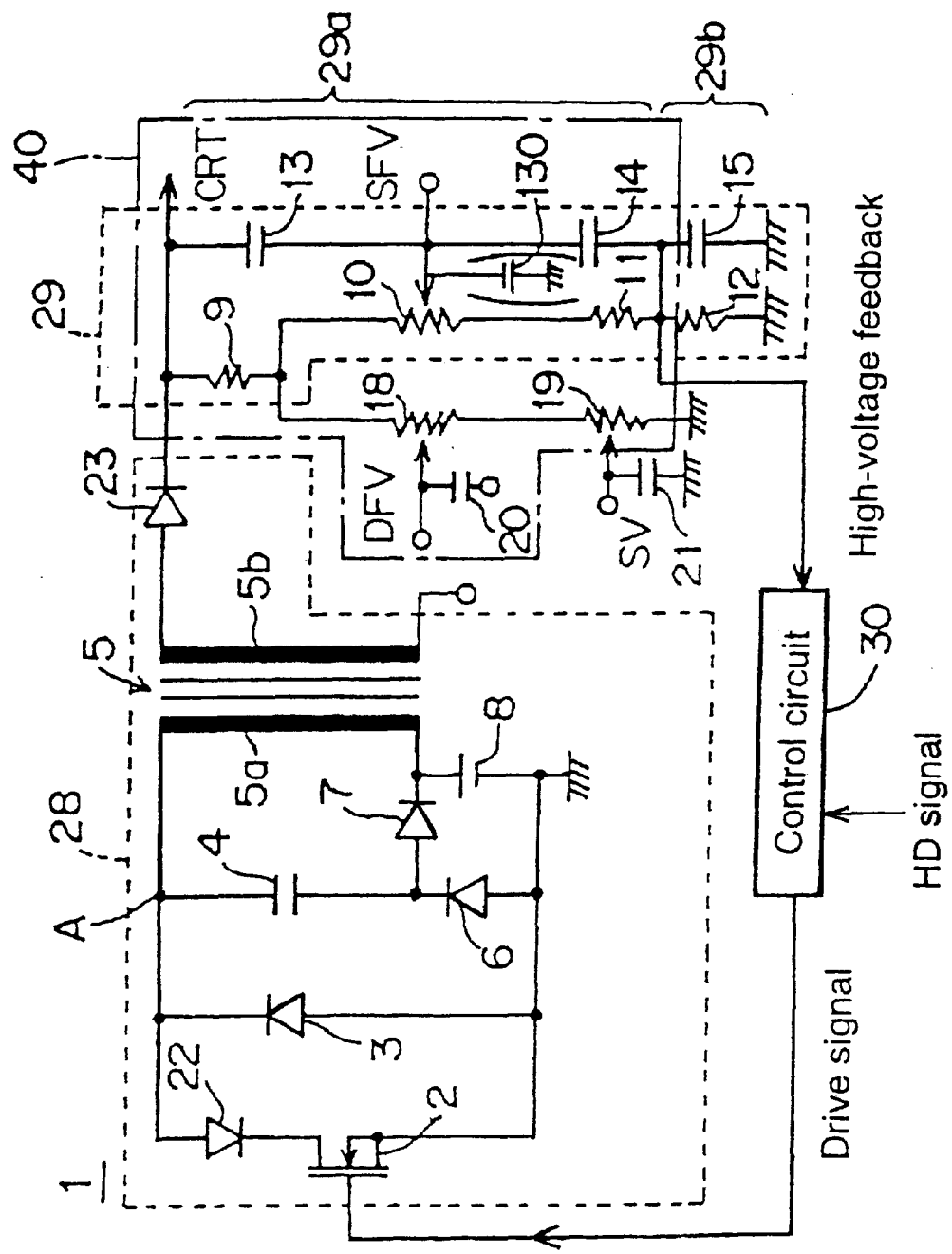
FIG. 1 is a circuit diagram of a high-voltage generating circuit according to a first embodiment of the present invention.

In a first embodiment, a so-called double-focus high-voltage generating circuit which outputs two kinds of focus voltages will be described. As shown in FIG. 1, a high-voltage generating circuit 1 generally includes a high-voltage production circuit 28, a high-voltage detecting circuit 29, and a control circuit 30. The high-voltage detecting circuit 29 detects a fluctuation of a high voltage output from the high-voltage production circuit 28. The control circuit 30 compensates the high voltage output from the high-voltage production circuit 28 for its fluctuation according to a detection voltage output from the high-voltage detecting circuit 29 to make the high voltage stable.

The high-voltage production circuit 28 is formed of a switching device 2, a damping diode 3, a resonant capacitor 4, a flyback transformer 5, clamping diodes 6 and 7, a driving power source 8, and rectifying diodes 22 and 23. Specifically, one end (a winding-start end, for example) of a primary coil Sa of the flyback transformer 5 is connected to the driving power source 8, and the other end (a winding-termination end) of the primary coil 5a is connected to the drain of a MOS field effect transistor (FET) 2 serving as the switching device through the rectifying diode 22. The source of the MOS FET 2 is connected to ground. The damping diode 3 is connected in parallel to the MOS FET 2 with its forward direction disposed opposite the current direction of the MOS FET 2. The winding-termination end of the primary coil 5a is connected to one end of the resonant capacitor 4, and the other end of the resonant capacitor 4 is connected to the cathode of the clamping diode 6. The anode of the clamping diode 6 is connected to ground. The connection point between the clamping diode 6 and the resonant capacitor 4 is connected to the anode of the clamping diode 7, and the cathode of the clamping diode 7 is connected to the connection point between the primary coil 5a and the driving power source 8.

The high-voltage detecting circuit 29 is formed of a high-voltage circuit section 29a including voltage-dividing resistors 9, 10, and 11 and speed-up capacitors 13 and 14, and a low-voltage circuit section 29b including a voltage-dividing resistor 12 and a speed-up capacitor 15. Most of a high voltage (1 kV to several tens of kilovolts) output from the high-voltage production circuit 28 is applied to the high-voltage circuit section 29a and the remaining voltage (several tens of volts) is applied to the low-voltage circuit section 29b. The connection point between the high-voltage circuit section 29a and the low-voltage circuit section 29b serves as a high-voltage detection point, and the voltage at this point is fed back to the control circuit 30.

The voltage-dividing resistor 9 plus a part of the voltage-dividing resistor 10, hereinafter collectively called a resistor R1, forms a parallel circuit together with the speed-up capacitor 13, hereinafter called a capacitor C1. The rest of the voltage-dividing resistor 10 plus the voltage-dividing resistor 11, hereinafter collectively called a resistor R2, forms a parallel circuit together with the speed-up capacitor 14, hereinafter called a capacitance C2. The voltage-dividing resistor 12, hereinafter called a resistor R3, forms a parallel circuit together with the speed-up capacitor 15, hereinafter called a capacitance C3. These three parallel circuits are connected in series to form a multiple-stage circuit, and connected to the high-voltage end of a second coil 5b of the flyback transformer 5 through the rectifying diode 23. A high voltage output from the high-voltage production circuit 28 is divided by the voltage-dividing resistors 9 to 12 and detected as a lower voltage.

Since a high voltage output from the high-voltage production circuit 28 is divided by the resistors R1 to R3, the voltages applied to the speed-up capacitors 13 to 15 connected in parallel to the resistors R1 to R3 are determined by the resistors R1 to R3. In the high-voltage circuit section 29a in the first embodiment, since the speed-up capacitors 13 and 14 are connected in series, the voltage applied to each of the speed-up capacitors 13 and 14 is lower than that applied to one speed-up capacitor in the conventional high-voltage circuit section. Therefore, capacitors having a low breakdown voltage can be used for the speed-up capacitors 13 and 14, and the speed-up capacitors can be made more compact.

The high-voltage generating circuit 1 is of a double-focus type, and includes a variable resistor 18 and a capacitor 20 for dynamic focus, a variable resistor 19 and a capacitor 21 for a screen voltage, and a variable resistor and a capacitor for static focus. The voltage-dividing resistor 10 and the speed-up capacitor 14 in the high-voltage detecting circuit 29 also serve as the variable resistor and the capacitor for static focus and the number of components used is reduced. The variable resistor 18 for dynamic focus, the variable resistor 19 for the screen, and the variable resistor 10 for static focus are, respectively, a resistor for outputting a dynamic focus voltage, a resistor for outputting a screen voltage, and a resistor for outputting a static focus voltage, respectively. The capacitor 14 for static focus and the capacitor 21 for the screen serve as noise filters to stabilize each voltage. The capacitor 20 for dynamic focus removes a DC component to stabilize a dynamic focus voltage.

The ground point of a series circuit formed of the variable resistor 18 for dynamic focus and the variable resistor 19 for the screen is separated from the ground point of the variable resistor 10 for static focus. Since usually the capacitor 20 for dynamic focus is set to about 500 pF and the capacitor 21 for the screen is set to about 1000 to 3000 pF in a double-focus type, if the ground point of the variable resistor 18 for dynamic focus and that of the variable resistor 10 for static focus are not separated but connected, a current flowing through the variable resistor 10 for static focus is likely to leak out from the capacitor 21 for the screen, and the capacitance of the speed-up capacitor 14 cannot be reduced. In this embodiment, however, since the ground point of the series circuit formed of the variable resistor 18 for dynamic focus and the variable resistor 19 for the screen is separated from the ground point of the variable resistor 10 for static focus and each is independently grounded, the current flowing through the variable resistor 10 for static focus is unlikely to leak out from the capacitor 21 for the screen, and the capacitance of the speed-up capacitor 14 can be reduced.

The parallel circuits formed of the capacitors C1 to C3 (the speed-up capacitors 13 to 15) and the resistors R1 to R3 come to have the same delay characteristic (or lead characteristic) when they are set to have values almost satisfying the following conditional equation (1).

$$R1 \times C1 = R2 \times C2 = R3 \times C3 \qquad (1)$$

Therefore, voltages applied to the parallel circuits do not fluctuate at the rise time (or fall time) of a high voltage output from the high-voltage production circuit 28. The speed-up capacitors 13 to 15 are easily designed in terms of breakdown voltages.

Figure 2:
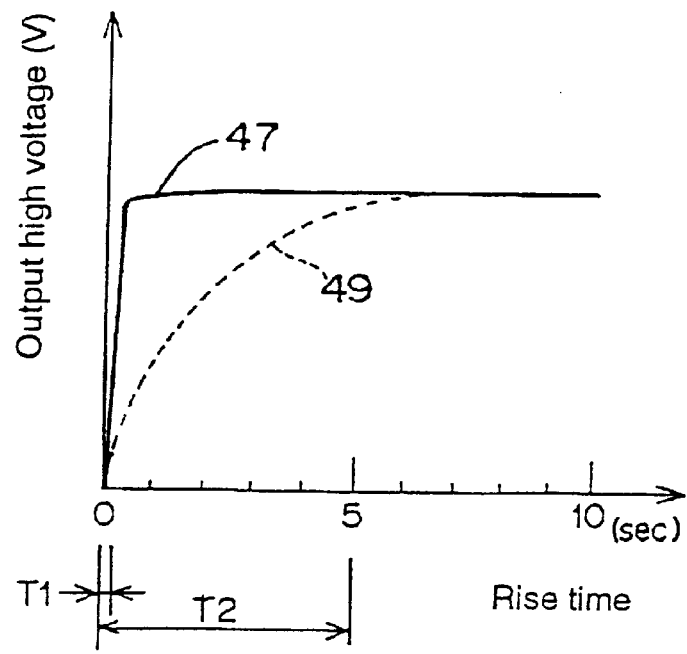
FIG. 2 is a graph indicating the rise time of the high voltage output from the high-voltage generating circuit shown in FIG. 1.
Figure 10:
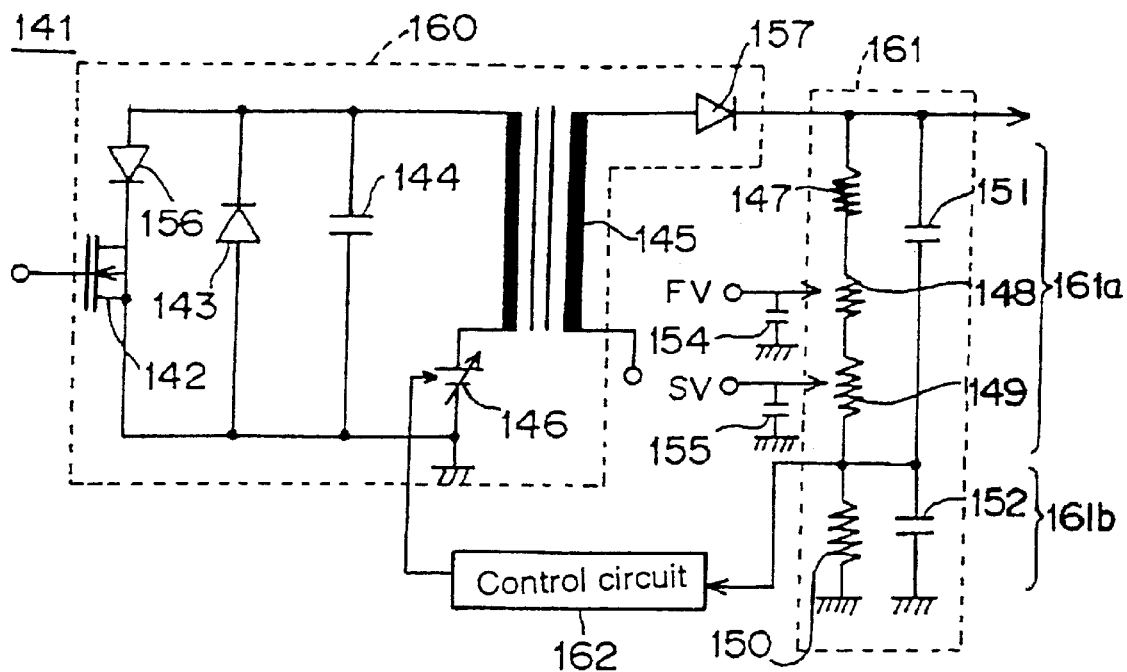
FIG. 10 is a circuit diagram of a conventional high-voltage generating circuit.
Figure 11:
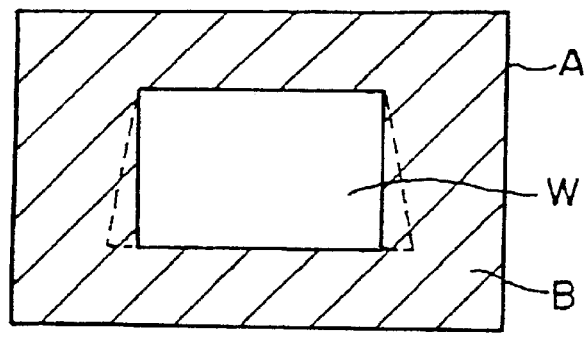
FIG. 11 is a view of the screen of a cathode-ray tube.

The high-voltage generating circuit 1 of the first embodiment has a good response for stabilizing a high voltage as described later and the speed-up capacitors 13 and 14 of the high-voltage circuit section 29a need not have large capacitances. Specifically, the capacitor C1 is set to about 20 to 30 pF, the capacitor C2 is set to about 1400 pF, and the capacitor C3 is set to about 0.1 μF. With these settings, the rise time of a high output voltage can be set to as short as about 0.2 seconds as shown by a solid line 47 in FIG. 2. FIG. 2 also shows the rise time of a high output voltage in the conventional high-voltage generating circuit 141 shown in FIG. 10, by a dotted line 49. Therefore, the blanking period T1 of the high-voltage generating circuit 1 according to the first embodiment can be set to an extremely short time as compared with the blanking period T2 of the conventional high-voltage generating circuit 141.

Figure 3:
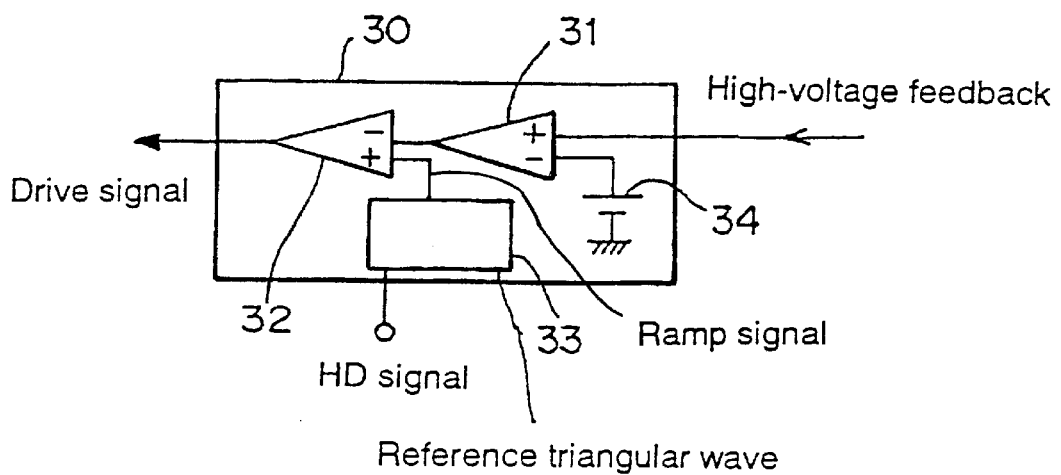
FIG. 3 is a circuit diagram of a control circuit shown in FIG. 1.

As shown in FIG. 3, the control circuit 30 includes an operational amplifier 31, a comparator 32, a reference triangular wave shaping circuit 33, and a reference power source 34. The detection voltage of the high-voltage detecting circuit 29 is input to the non-inverting input terminal of the operational amplifier 31. A reference voltage output from the reference power source 34 is input to the inverting input terminal of the operational amplifier 31. The operational amplifier 31 compares the detection voltage with the reference voltage and outputs the signal corresponding to a reduction of a high output voltage to the inverting input terminal of the comparator 32. A signal output from the reference triangular wave shaping circuit 33 is input to the non-inverting input terminal of the comparator 32.

The operation for stabilizing a high voltage in the high-voltage generating circuit 1 will be described below by referring to a timing chart shown in FIG. 4.

The reference triangular wave shaping circuit 33 integrates a horizontal drive signal (hereinafter called an HD signal) synchronized with a horizontal deflection output circuit (not shown) and shown in FIG. 4(e) to generate a ramp signal shown in FIG. 4(d) and applies the ramp signal to the non-inverting input terminal of the comparator 32. The comparator 32 compares the ramp signal with the signal from the operational amplifier 31 and generates a drive signal which rises at a point where the output of the operational amplifier and the ramp signal have the same voltage and falls at a point where the ramp signal falls, that is, the point where the HD signal rises, as shown in FIGS. 4(d) and 4(c). When the high output voltage decreases, the output of the operational amplifier 31 decreases. As a result, the pulse width of the drive signal increases. See FIG. 4(a). The comparator 32 generates a drive signal which has a wider pulse width as the high output voltage decreases and applies it to the MOS FET 2. Conversely, when the high output voltage increases, the output of the operational amplifier 31 increases. As a result, the pulse width of the drive signal decreases. See FIG. 4(c). The MOS FET 2 switches according to the ON pulse width of the drive signal.

When the MOS FET 2 goes on at to as shown in FIG. 4(c), a current flows from the driving power source 8 through the primary coil 5a and the MOS FET 2 to ground. The current flowing through the primary coil 5a increases with time as shown in FIG. 4(b) and electromagnetic energy is accumulated in the primary coil 5a by this current flow. The period while the MOS FET 2 is on is called a transistor period.

When the MOS FET 2 goes off at $t_1$, a current flows from the primary coil 5a through the resonant capacitor 4 and the clamping diode 7. LC series resonance starts with the inductance of the primary coil 5a and the capacitance of the resonant capacitor 4, and a flyback pulse (voltage pulse) shown in FIG. 4(a) is generated. The period from ($t_1$) when the flyback pulse is generated to ($t_2$) when it finishes is called a flyback period. The flyback pulse becomes maximum when all electromagnetic energy at the primary coil 5a is converted to the electrostatic energy of the resonant capacitor 4. After all electromagnetic energy at the primary coil 5a is converted to the electrostatic energy of the resonant capacitor 4, a reverse current flows from the clamping diode 6 through the resonant capacitor 4 and the primary coil 5a to the driving power source 8. The electrostatic energy of the resonant capacitor 4 is thus reversely converted to the electromagnetic energy of the primary coil 5a.

When the pulse finishes at $t_2$, the voltage at point A in the circuit shown in FIG. 1 becomes zero. At the time, the damping diode 3 is turned on and a current flows from ground through the damping diode 3 to the primary coil 5a. With this reverse current flow, the voltage at point A increases. When the voltage becomes equal to the voltage E of the driving power source 8, the damping diode 3 is turned off.

When the MOS FET 2 is turned on again at $t_4$, point A is grounded and a current flowing from the driving power source 8 to the primary coil 5a flows through the MOS FET 2 to ground. The circuit condition matches that at $t_0$. The operations from $t_0$ to $t_4$ are repeated to continue the circuit operation. The flyback pulse generated at the primary coil 5a is stepped up in the flyback transformer 5 and applied to the anode of the cathode-ray tube through the rectifying diode 23.

As described above, unlike a high-voltage generating circuit employing the conventional +B control method (a method in which a power voltage is smoothed and then applied to the primary winding of a flyback transformer), since the high-voltage generating circuit 1 employs a pulse-width control method (a method in which a +B voltage is pulse-width controlled and applied to the primary winding of a flyback transformer without smoothing by a large-capacitance capacitor) to directly control the pulse width of a driving signal, it provides a good response for stabilizing the high voltage. As a result, although the flyback transformer 5 employs a peak rectifying method, the high output voltage is compensated for its fluctuation without a delay and stabilized at a high speed. Therefore, the speed-up capacitors 13 and 14 of the high-voltage circuit section 29a in the high-voltage detecting circuit 29 need not have large capacitances.

Since this high-voltage generating circuit 1 provides a good response for stabilizing the high voltage, when used for a cathode-ray tube which has been used at a high frequency, image distortion can be suppressed to a level where the distortion is almost neglected, only by the use of a capacitance of several hundreds to several thousands of picofarads which a cathode-ray tube usually has, even for a ripple component. For example, when it is assumed that a cathode-ray tube has a capacitance of 1000 pF and a beam current of 2 mA flows in the cathode-ray tube, if the frequency of the scanning line of the cathode-ray tube is 15.75 kHz, a horizontal ripple ΔV is expressed as follows:

$$\Delta V = (2\ mA \times 64\ \mu s)/1000\ pF = 128\ V.$$

When the frequency of the scanning line increases to 32 kHz, the horizontal ripple is expressed as follows:

$$\Delta V = (2\ mA \times 32\ \mu s)/1000\ pF = 64\ V.$$

This means that image distortion can be almost neglected with the use of the capacitor of the cathode-ray tube. Therefore, the speed-up capacitors 13 and 14 of the high-voltage circuit section 29a in the high-voltage detecting circuit 29 need not have large capacitances in order to eliminate image distortion. As a result, the speed-up capacitors 13 and 14 can have small capacitances and can be made more compact.

The high-voltage generating circuit 1 configured as described above has the speed-up capacitors 13 and 14 having small sizes. Therefore, they can be contained in a high-voltage variable resistor unit 40 (a section enclosed by a one-dot chain line in FIG. 1) and the high-voltage generating circuit 1 can be made more compact. As shown in FIG. 5, the high-voltage variable resistor unit 40 is provided with an insulating case 41 and two ceramic circuit boards 42 and 43 received into the insulating case 41. FIG. 5 is an internal plan viewed from the bottom of the high-voltage variable resistor unit 40.

The fixed voltage-dividing resistor 9 is mounted on the front surface of the circuit board 42. The variable resistor 10 for static focus, the fixed voltage-dividing resistor 11, the variable resistor 18 for dynamic focus, and the variable resistor 19 for a screen are mounted on the front surface of the circuit board 43, and are electrically connected by a circuit conductive member (not shown) appropriately. The circuit boards 42 and 43 are connected through a lead wire 45. The reason why the fixed resistor 9 is separated from the variable resistors 10, 18, and 19 and mounted on a different circuit board is to avoid the use of large-size capacitors having high breakdown voltages for the variable resistors 10, 18, and 19. A high voltage output from the high-voltage production circuit 28 is dropped to a lower voltage by the fixed resistor 9 having a high breakdown voltage, and the lower voltage is applied to the circuit conductive member of the circuit board 43 through the lead 45. A voltage on the circuit board 43 is lowered and the breakdown voltages of the variable resistors 10, 18, and 19 may be low.

The speed-up capacitors 13 and 14 and the capacitor 20 for dynamic focus are disposed on the rear surface of the circuit boards 42 and 43. That is, they can be placed at a space between the rear cover (not shown) of the case 41 and the circuit boards 42 and 43, which is conventionally a dead space, and the space inside the high-voltage variable resistor unit 40 is efficiently used. Since the speed-up capacitors 13 and 14 have small capacitances, ceramic capacitors, which are made compact more easily than conventionally used film capacitors, can be used for them, and they can be further made compact.

Second Embodiment

Figure 6:
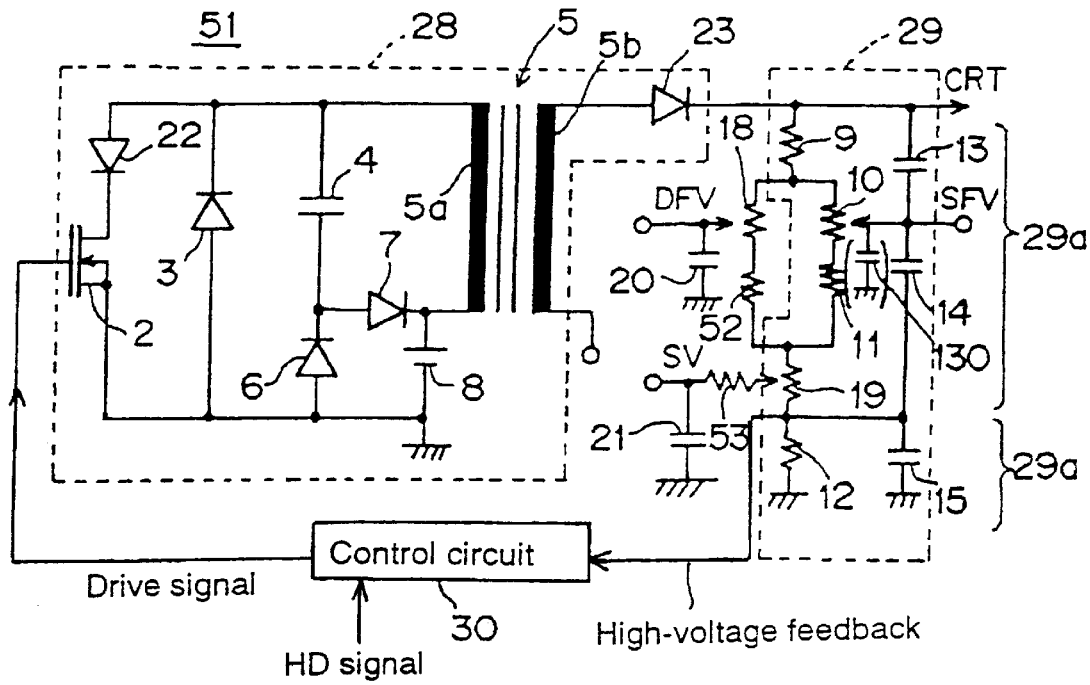
FIG. 6 is a circuit diagram of a high-voltage generating circuit according to a second embodiment of the present invention.

In a second embodiment, as shown in FIG. 6, a so-called double-focus high-voltage generating circuit 51 will be described below in which the ground side of a variable resistor 18 for dynamic focus is electrically connected to the ground side of a variable resistor 10 for static focus and they are grounded through a variable resistor 19 for a screen. The high-voltage detecting circuit 29 is formed of a high-voltage circuit section 29a including voltage-dividing resistors 9, 10 and 11, the variable resistor 19 for the screen, and speed-up capacitors 13 and 14, and a low-voltage circuit section 29b including a voltage-dividing resistor 12 and a speed-up capacitor 15. Most of a high voltage (1 kV to several tens of kilovolts) output from the high-voltage production circuit 28 is applied to the high-voltage circuit section 29a and the remaining voltage (several tens of volts) is applied to the low-voltage circuit section 29b.

The voltage-dividing resistor 9 plus a part of the voltage-dividing resistor 10, hereinafter collectively called a resistor R1, forms a parallel circuit together with the speed-up capacitor 13, hereinafter called a capacitor C1. The rest of the voltage-dividing resistor 10 plus the voltage-dividing resistor 11 and the resistor 19 for the screen, hereinafter collectively called a resistor R2, forms a parallel circuit together with the speed-up capacitor 14, hereinafter called a capacitance C2. The voltage-dividing resistor 12, hereinafter called a resistor R3, forms a parallel circuit together with the speed-up capacitor 15, hereinafter called a capacitance C3. These three parallel circuits are connected in series to form a multiple-stage circuit. The voltage-dividing resistor 10 and the speed-up capacitor 14 in the high-voltage detecting circuit 29 also serve as the variable resistor and the capacitor for static focus, and the variable resistor 19 for the screen also serves as a voltage-dividing resistor in the high-voltage detecting circuit 29. The number of components used is reduced in this way.

Since usually the capacitor 21 for the screen is set to as large as about 1000 to 3000 pF in a double-focus type, a current flowing through the variable resistor 10 for static focus is likely to leak out from the capacitor 21 for the screen, and the capacitance of the speed-up capacitor 14 cannot be reduced. In the second embodiment, however, since a resistor 53 is connected in series to the capacitor 21 for the screen, the capacitance of the capacitor 21 for the screen can be set to about 300 pF and the capacitance of the speed-up capacitor 14 is reduced. There is also shown a resistor 52 for balance in the figure. The high-voltage generating circuit 51 configured as described above achieves the same advantages as the high-voltage generating circuit 1 in the first embodiment and provides a simplified circuit configuration.

Third Embodiment

Figure 7:
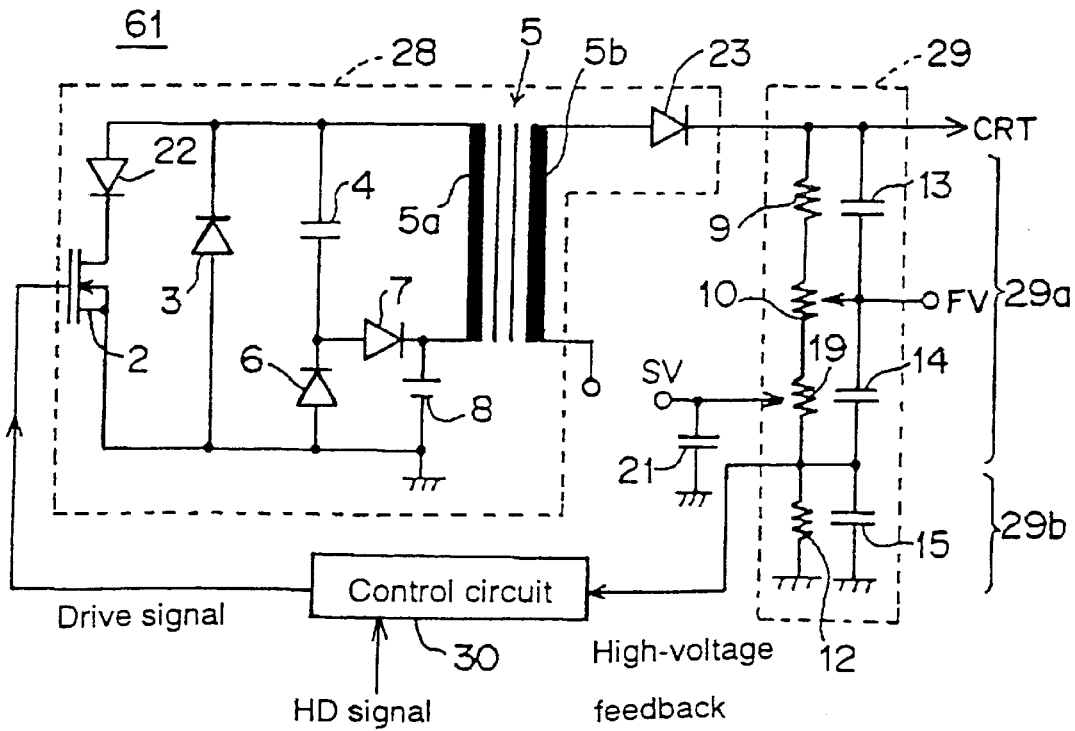
FIG. 7 is a circuit diagram of a high-voltage generating circuit according to a third embodiment of the present invention.

In a third embodiment, as shown in FIG. 7, a so-called single-focus high-voltage generating circuit 61 which outputs one type of focus voltage will be described below. A high-voltage detecting circuit 29 is formed of a high-voltage circuit section 29a including voltage-dividing resistors 9 and 10, a variable resistor 19 for a screen, and speed-up capacitors 13 and 14, and a low-voltage circuit section 29b including a voltage-dividing resistor 12 and a speed-up capacitor 15.

The voltage-dividing resistor 9 plus a part of the voltage-dividing resistor 10, hereinafter collectively called a resistor R1, forms a parallel circuit together with the speed-up capacitor 13, hereinafter called a capacitor C1. The rest of the voltage-dividing resistor 10 plus the resistor 19 for the screen, hereinafter collectively called a resistor R2, forms a parallel circuit together with the speed-up capacitor 14, hereinafter called a capacitance C2. The voltage-dividing resistor 12, hereinafter called a resistor R3, forms a parallel circuit together with the speed-up capacitor 15, hereinafter called a capacitance C3. These three parallel circuits are connected in series to form a multiple-stage circuit. The high-voltage generating circuit 61 is of a single focus type and includes the variable resistor 19 and a capacitor 21 for the screen, and a variable resistor and a capacitor for focus.

The variable resistor 19 for the screen also serves as a voltage-dividing resistor in the high-voltage detecting circuit 29 and the voltage-dividing resistor 10 and the speed-up capacitor 14 in the high-voltage detecting circuit 29 also serve as the variable resistor and the capacitor for focus. The number of components used is reduced in this way.

Since a high voltage output from the high-voltage production circuit 28 is divided by the resistors R1 to R3, the voltages applied to the speed-up capacitors 13 to 15 connected in parallel to the resistors R1 to R3 are determined by the resistors R1 to R3. In the high-voltage circuit section 29a, since the speed-up capacitors 13 and 14 are connected in series, the number of speed-up capacitors in the high-voltage circuit section 29a increases as compared with the case in the conventional high-voltage detecting circuit, and the voltage applied to each of the speed-up capacitors 13 and 14 becomes lower. Therefore, capacitors having a low breakdown voltage can be used for the speed-up capacitors 13 and 14, and the speed-up capacitors can be made more compact.

Fourth Embodiment

Figure 8:
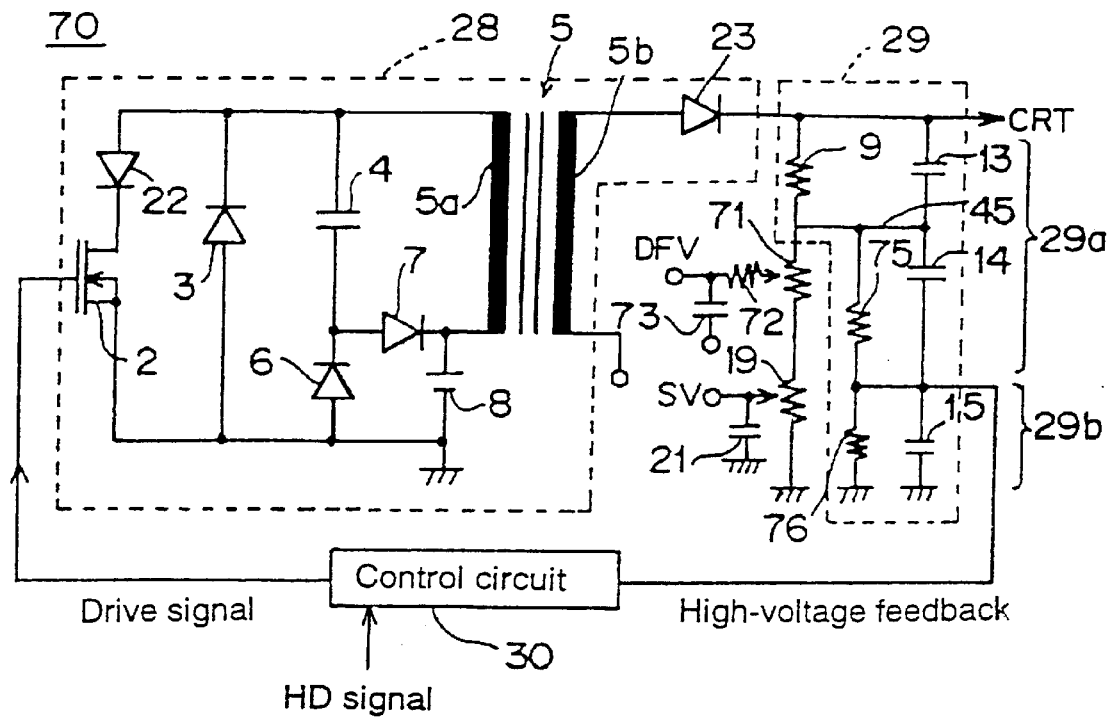
FIG. 8 is a circuit diagram of a high-voltage generating circuit according to a fourth embodiment of the present invention.

In a fourth embodiment, as shown in FIG. 8, a so-called single-focus high-voltage generating circuit 70 which outputs a dynamic focus voltage will be described below. A high-voltage detecting circuit 29 is formed of a high-voltage circuit section 29a including voltage-dividing resistors 9 and 75, and speed-up capacitors 13 and 14, and a low-voltage circuit section 29b including a voltage-dividing resistor 76 and a speed-up capacitor 15. The voltage-dividing resistor 9 forms a parallel circuit together with the speed-up capacitor 13. The voltage-dividing resistor 75 forms a parallel circuit together with the speed-up capacitor 14. The voltage-dividing resistor 76 forms a parallel circuit together with the speed-up capacitor 15. These three parallel circuits are connected in series to form a multiple-stage circuit.

The high-voltage generating circuit 70 is of a single focus type and includes a variable resistor 71, a resistor 72, and a capacitor 73 for dynamic focus, and a variable resistor 19 and a capacitor 21 for the screen.

In the high-voltage circuit section 29a of the high-voltage detecting circuit 29, one end of the speed-up capacitor 13 disposed at the high output voltage side is electrically connected to one end of the fixed voltage-dividing resistor 9. The other end of the speed-up capacitor 13 is electrically connected to the other end of the voltage-dividing resistor 9 through a lead 45 which connects the two circuit boards 42 and 43 shown in FIG. 5. Without increasing the number of connection points, the speed-up capacitor 13 and the voltage-dividing resistor 9 are electrically connected.

Since the speed-up capacitors 13 and 14 are connected in series, the number of speed-up capacitors in the high-voltage circuit section 29a increases as compared with the case in the conventional high-voltage detecting circuit, and the voltage applied to each of the speed-up capacitors 13 and 14 becomes lower. Therefore, capacitors having a low breakdown voltage can be used for the speed-up capacitors 13 and 14, and the speed-up capacitors can be made more compact.

Fifth Embodiment

Figure 9:
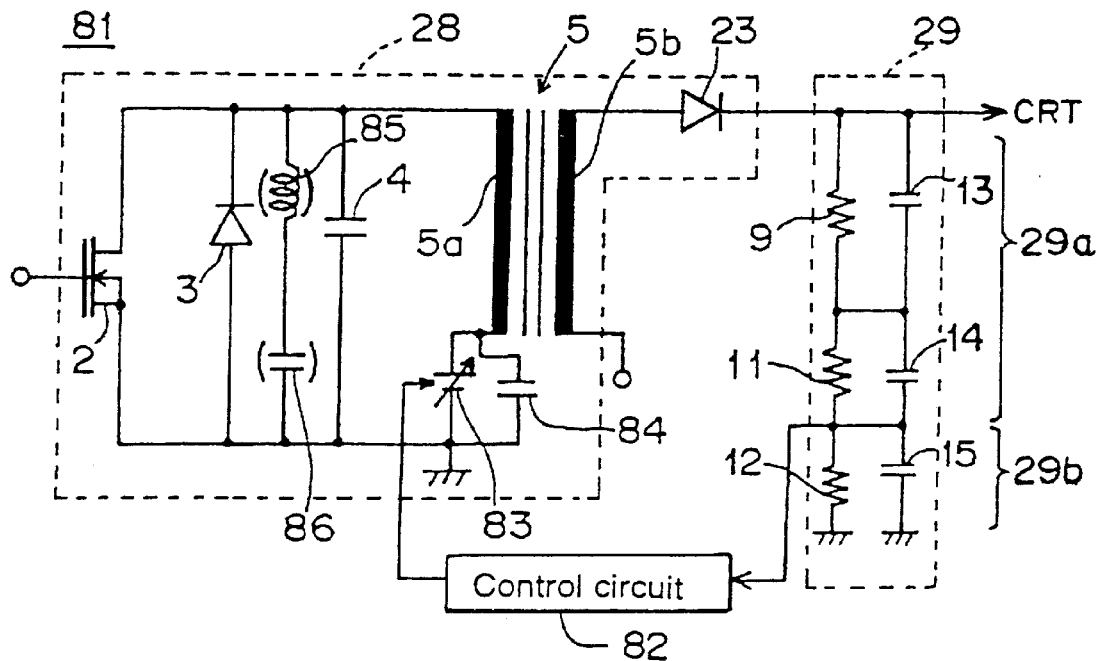
FIG. 9 is a circuit diagram of a high-voltage generating circuit according to a fifth embodiment of the present invention.

In a fifth embodiment, as shown in FIG. 9, a high-voltage generating circuit 81 employing a so-called +B control method (a method in which a power voltage is smoothed and then applied to the primary winding of a flyback transformer) will be described below. This circuit controls a variable driving power source 83 according to a fluctuation of the high voltage output from a high-voltage production circuit 28 to compensate the high voltage for the fluctuation. The high-voltage production circuit 28 is formed of a switching device 2, a damping diode 3, a resonant capacitor 4, a flyback transformer 5, the variable driving power source 83, a smoothing capacitor 84, and a rectifying diode 23.

A high-voltage detecting circuit 29 is formed of a high-voltage circuit section 29a including voltage-dividing resistors 9 and 11, and speed-up capacitors 13 and 14, and a low-voltage circuit section 29b including a voltage-dividing resistor 12 and a speed-up capacitor 15. The voltage-dividing resistor 9 forms a parallel circuit together with the speed-up capacitor 13. The voltage-dividing resistor 11 forms a parallel circuit together with the speed-up capacitor 14. The voltage-dividing resistor 12 forms a parallel circuit together with the speed-up capacitor 15. These three parallel circuits are connected in series to form a multiple-stage circuit.

Since the speed-up capacitors 13 and 14 are connected in series, the number of speed-up capacitors in the high-voltage circuit section 29a increases as compared with the case in the conventional high-voltage detecting circuit, and the voltage applied to each of the speed-up capacitors 13 and 14 becomes lower. Therefore, capacitors having a low breakdown voltage can be used for the speed-up capacitors 13 and 14, and the speed-up capacitors can be made more compact.

The high voltage output from the high-voltage production circuit 28 is divided by the voltage-dividing resistors 9, 11, and 12 to a lower voltage and detected. The detected voltage is applied to a control circuit 82. The control circuit 82 controls the variable driving power source 83 according to the detected voltage. The driving voltage output from the variable driving power source 83 is smoothed by the smoothing capacitor 84 and applied to the primary winding of the flyback transformer 5 as a +B voltage.

Modification

A high-voltage generating circuit according to the present invention is not limited to those described in the above embodiments. It can be modified in various ways within the scope of the invention.

In the foregoing embodiments, a MOS FET is used for the switching device 2. Instead, a bipolar transistor may be used. Instead of the capacitor for static focus also serving as a speed-up capacitor, a different capacitor 130 (shown in FIGS. 1 and 6 in parentheses) may be used as a speed-up capacitor. A bleeder resistor may be used as a voltage-dividing resistor instead of the variable resistor for dynamic focus and the variable resistor for static focus.

In the fourth embodiment, the speed-up capacitor 13 in the first parallel circuit is connected to the voltage-dividing resistor 9 through the lead 45 in the single-focus high-voltage generating circuit. Even in a double-focus high-voltage generating circuit, a speed-up capacitor in a first parallel circuit may be connected to a voltage-dividing resistor through the lead 45. In this case, the same advantages are obtained.

It is preferred in the fifth embodiment in order to increase response for stabilizing a high voltage that a method in which the +B voltage is pulse-width controlled and the pulse voltage of the driving power source is directly applied to the primary coil of the flyback transformer be employed. The high-voltage generating circuit may be configured such that the resonant capacitor 4 is connected in parallel to a series circuit formed of a deflection yoke 85 and a capacitor 86 for correcting S-shaped distortion, and all of these components are driven at the same time.

The variable resistor for dynamic focus, the variable resistor for static focus, and the variable resistor for the screen in a double-focus circuit, or the variable resistor for focus and the variable resistor for the screen in a single-focus circuit may also serve as voltage-dividing resistors in the high-voltage circuit section.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A high-voltage generating circuit comprising:
    a high-voltage production circuit for accumulating electric energy supplied from a power source in an LC resonant circuit during an on-stage of a switching element when the switching element is turned on and for converting electric energy accumulated in said LC resonant circuit to a high voltage during a flyback period determined by the resonant frequency of said LC resonant circuit;
    a high-voltage detecting circuit including a high-voltage circuit section comprising a multiple-stage parallel circuit in which two or more parallel circuits each having a voltage-dividing resistor and a speed-up capacitor are connected in series and a low-voltage circuit section which is connected in series with said high-voltage circuit section and which has a parallel circuit comprising a further voltage-dividing resistor and a further speed-up capacitor, said high-voltage detecting circuit providing a detected voltage by dividing the high voltage output from said high-voltage production circuit by said voltage-dividing resistors into a lower voltage and thereby detecting said high voltage; and
    a control circuit for controlling a drive signal for the switching element according to the detected voltage detected by said high-voltage detecting circuit so as to control said high voltage.

2. The high-voltage generating circuit of claim 1, wherein at least one of the voltage-dividing resistors in said high-voltage circuit section serves as one of a variable resistor for dynamic focus, a variable resistor for static focus, and a variable resistor for a screen voltage in a double-focus circuit.

3. The high-voltage generating circuit of claim 1, wherein at least one of the voltage-dividing resistors in said high-voltage circuit section serves as one of a variable resistor for focus or variable resistor for a screen in a single-focus circuit.

4. The high-voltage generating circuit of claim 1, wherein a speed-up capacitor in said high-voltage circuit section serves as a capacitor for static focus in a double-focus circuit.

5. The high-voltage generating circuit of claim 1, wherein a speed-up capacitor in said high-voltage circuit section serves as a capacitor for focus in a single-focus circuit.

6. The high-voltage generating circuit of claim 1, wherein a first ground point of a series circuit comprising a variable resistor for dynamic focus and a variable resistor for a screen in a double-focus circuit is electrically separated from a second ground point of a variable resistor for static focus in said double-focus circuit;
    at least one of the voltage-dividing resistors in said high-voltage circuit section serves as said variable resistor for static focus; and at least one of the speed-up capacitors in said high-voltage circuit section serves as a capacitor for static focus.

7. The high-voltage generating circuit of claim 1, wherein a high-voltage-side parallel circuit in said high-voltage circuit section comprises one speed-up capacitor and one fixed voltage-dividing resistor; and both ends of said speed-up capacitor are connected to respective ends of said fixed voltage-dividing resistor.

8. The high-voltage generating circuit of claim 1, further comprising a variable resistor for dynamic focus, a variable resistor for static focus, and a variable resistor for a screen in a double-focus circuit mounted on the front surface of a circuit board;

at least one of the speed-up capacitors in said high-voltage circuit section, and a further capacitor for dynamic focus and a capacitor for static focus in said double-focus circuit are disposed on the rear surface of said circuit board; and said circuit board is accommodated into one insulating case.

9. A high-voltage generating circuit comprising:

a high-voltage production circuit for accumulating electric energy supplied from a power source in an LC resonant circuit during an on-stage of a switching element when the switching element is turned on and for converting electric energy accumulated in said LC resonant circuit to a high voltage during a flyback period determined by the resonant frequency of said LC resonant circuit;

a high-voltage detecting circuit including a high-voltage circuit section comprising a multiple-stage parallel circuit in which two or more parallel circuits each having a voltage-dividing resistor and a speed-up capacitor are connected in series and a low-voltage circuit section which is connected in series with said high-voltage circuit section and which has a parallel circuit comprising a further voltage-dividing resistor and a further speed-up capacitor, said high-voltage detecting circuit providing a detected voltage by dividing the high voltage output from said high-voltage production circuit by said voltage-dividing resistors into a lower voltage and thereby detecting said high voltage; and a control circuit for controlling a drive signal for the switching element according to the detected voltage detected by said high-voltage detecting circuit so as to control said high voltage;

wherein the control circuit comprises a circuit for pulse width modulating a drive signal coupled to a control input of a transistor switch coupled into said LC resonant circuit thereby to stabilize said high voltage.

10. The high voltage generating circuit of claim 1, wherein the control circuit comprises a circuit for controlling a voltage level of a power supply voltage source supplying power to said resonant LC circuit thereby to stabilize said high voltage.

* * * * *